Sept. 13, 1932.   F. H. BANNER   1,876,550

METHOD OF MAKING WRIST PINS

Filed May 3, 1928

FIG.4.

INVENTOR
F. H. Banner,
BY Neil D. Preston,
his ATTORNEY

Patented Sept. 13, 1932

1,876,550

UNITED STATES PATENT OFFICE

FRANK H. BANNER, OF ROCHESTER, NEW YORK, ASSIGNOR TO GENERAL RAILWAY SIGNAL COMPANY, OF ROCHESTER, NEW YORK

METHOD OF MAKING WRIST PINS

Application filed May 3, 1928. Serial No. 274,932.

This invention relates in general to wrist pins, and has more particular reference to wrist pins furnished with lubricating means and having the body and head formed of separate pieces of material.

The wrist pins forming the subject matter of the present invention can be used in any usual or desired connection such, for example, as forming an axle on which is mounted a rockable lever, or for connecting a crank arm to a connecting rod, etc.

In order to lessen the cost of manufacture it is desirable to form the wrist pin with a separate head connected to the body as in this manner the body can be formed from stock having the dimensions of the finished pin body, and thus avoid much machining. In connecting the head to the body, after a lubricating duct is formed in the body, the connection between the body and the head must be at such a point as to prevent the lubricating duct from weakening the connection.

At the same time it is most desirable to form a very rugged and durable construction, cheap to manufacture, simple in form, and long lived in service.

With the above and other objects in view it is proposed, in accordance with this invention, to form a wrist pin from cylindrical stock having the diameter of the body of the finished pin, a peripheral groove being formed in the body near one end and a projecting ring being positioned in the groove to form a head for the wrist pin. The connection between the head and the body thus is spaced from the longitudinal axis of the body whereby not to be interfered with by a lubricating duct formed in the longitudinal axis of the body.

The head can be formed of a ring of stock having either rectangular or cylindrical cross section, can be rolled into the groove, and finally the ends of the ring can be spot welded in place, if desired, to make a continuous ring.

Further objects, purposes and characteristic features of the invention will appear as the description progresses, reference being had to the accompanying drawing, showing, solely by way of illustration, and not in any manner in a limiting sense, several forms which the invention can assume. In the drawing:—

Fig. 4 is a perspective view of the piece of stock of Fig. 3 in the form assumed in an intermediate stage.

Figure 1:
Fig. 1 is a side elevation of a piece of stock forming the body of a wrist pin.
Figure 2:
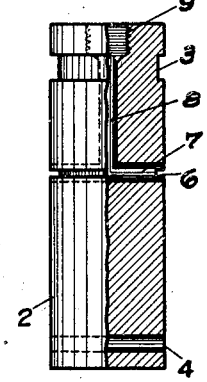
Fig. 2 is a side elevation, with parts shown in section, of the body of a wrist pin with the head removed.

Referring now to the drawing, a piece of cylindrical stock 1, as shown in Fig. 1, is cut to the length of the finished wrist pin and forms the body 2 of the wrist pin. The body 2 is furnished with a peripheral groove 3 of rectangular cross section, near one end of the body, and with a cross bore 4, near the other end of the body, for receiving a retaining cotter pin 5.

For lubricating the outer surface of the body 2 of the pin a peripheral groove 6 is formed in the body and is connected by means of a cross bore 7, with a longitudinal axial bore 8, terminating at the head end of the body in an enlarged threaded opening 9, for receiving the nozzle 10 of a grease gun or other lubricating means, whereby lubricant can be forced to the outer surface of the pin body.

Figure 3:
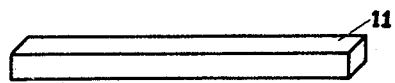
Fig. 3 is a perspective view of a length of rectangular stock used to form the head of the wrist pin.
Figure 5:
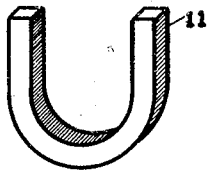
Fig. 5 is a fragmentary elevational view of the body, and the head in the intermediate stage of Fig. 4.

The head of the wrist pin, in one form of this invention, is formed of a piece of rectangular stock 11, cut to a length, as shown in Fig. 3, substantially equal to the diameter of the root of groove 3. This head piece 11 is then formed into a U shape member, as shown in Fig. 4, by means of pressing or otherwise with a circular portion equal in diameter to that of the inner diameter of the groove 3. This U-shaped member 11 is then placed in the groove 3 of the body 2, as shown in Fig. 5, after which it is placed in a die and the ends 12 of the U are pressed toward each other to bring them practically together as shown in Fig. 6, to form a ring closely fitting the groove 3, substantially completely encircling the body 2, and projecting beyond the surface of the body 2 to form a head for the wrist pin.

Figure 7:
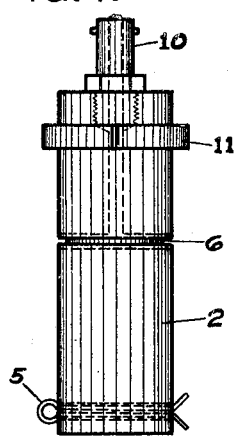
Fig. 7 is an elevational view of the complete wrist pin furnished with a head of the form shown in Fig. 6.
Figure 6:
Fig. 6 is a fragmentary elevational view of the body with the head applied thereto in its finished form.

The head 11 of the wrist pin, as shown in Fig. 6, is so tightly pressed into the groove 3 that it is firmly held in place and no additional means for securing it is ordinarily necessary. The complete pin is shown in Fig. 7.

Figure 8:
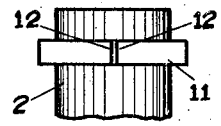
Fig. 8 is a fragmentary elevational view of the body with a first modified form of head.

Under certain conditions, however, it may be desirable to somewhat more firmly hold the head 11 in place, and means for doing this is shown in a first modified form of the invention, in Fig. 8. In this form of the invention the head 11 has its adjacent ends 12, joined together, as pot welded, for example, as shown at 13, so as to form a continuous ring.

Figure 9:
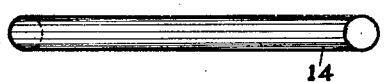
Fig. 9 is a perspective view of a length of cylindrical stock used to form a second modified form of head.
Figure 10:
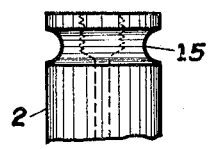
Fig. 10 is a fragmentary elevational view of a modified form of body for receiving the said second modified form of head.

A second modified form of the invention is shown in Figs. 9 and 10, wherein a length of cylindrical stock 14 is employed in place of the rectangular stock 11 of Fig. 3, for making the head of the pin. This cylindrical length 14 is worked in exactly the same manner as described above in connection with the rectangular head, it being first formed into a U, then placed in the groove 15 of the pin body 2, the groove 15 in this case being semicircular in cross section instead of rectangular as in connection with the first form. Then the U is pressed into place in the groove 15, as above described, to form a ring of circular cross section snugly embracing the pin body 2 within the groove in the pin, and projecting beyond the surface of the body to form a retaining head.

As in connection with the first modified form shown in Fig. 8, the adjacent ends of the head 14 can be spot welded, if desired, to form an integral continuous head member in exactly the same manner as described in connection with the form shown in Fig. 8.

The various above forms of wrist pins all constitute wrist pins which are rugged and simple in construction, cheap to manufacture, and efficient and long lived in operation.

The above rather specific description of various forms of this invention are given solely by way of illustration, and are not intended in any manner whatsoever in a limiting sense. Obviously, the invention can assume various different physical forms, and is susceptible of numerous modifications, and all such forms and modifications as come within the scope of the appended claims, are intended to be covered by this application.

Having described my invention, I now claim:—

1. The method of making wrist pins, comprising, cutting a piece of cylindrical stock to length to form a body, forming a continuous peripheral groove near one end of said body, cutting a length of straight stock of a cross section complementary to the peripheral groove and of a length equal to the circumference of the groove, forming said piece of stock into a U, and then pressing the ends of the U together around the body and in the groove to form a head of uniform cross section on the body to completely encircle the body.

2. The method of making wrist pins, comprising, cutting a piece of cylindrical stock to length to form a body, forming a continuous peripheral groove near one end of said body, cutting a length of straight stock of a cross section complementary to the peripheral groove and of a length equal to the circumference of the groove, forming said piece of stock into a U, then pressing the ends of the U together around the body and in the groove to form a head of uniform cross section on the body, and spot welding the ends of the head thus formed.

3. The method of making a wrist pin, comprising, cutting a piece of cylindrical stock to the length of the finished pin to form a body, cutting a peripheral groove of uniform cross-section in the body near one end and completely encircling the body, and pressing a strip of material of uniform cross section into the groove to form a ring positioned in the groove and projecting beyond the surface of the body.

In testimony whereof I affix my signature.

FRANK H. BANNER.